United States Patent
Minemura

(10) Patent No.: US 7,391,699 B2
(45) Date of Patent: Jun. 24, 2008

(54) INFORMATION REPRODUCING METHOD AND AN INFORMATION REPRODUCING DRIVE UTILIZING PRML TO OUTPUT BINARY VALUES

(75) Inventor: Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 10/643,975

(22) Filed: Aug. 20, 2003

(65) Prior Publication Data

US 2004/0208106 A1    Oct. 21, 2004

(30) Foreign Application Priority Data

Apr. 21, 2003    (JP)    ............... 2003-115871

(51) Int. Cl.
*G11B 7/005*    (2006.01)
(52) U.S. Cl. .................................... 369/59.22
(58) Field of Classification Search .... 369/59.21–59.23
See application file for complete search history.

(56) References Cited

U.S. PATENT DOCUMENTS

| | | | | |
|---|---|---|---|---|
| 5,796,693 | A * | 8/1998 | Taguchi et al. | 369/59.22 |
| 6,683,922 | B1 * | 1/2004 | Hayami et al. | 375/341 |
| 7,076,006 | B2 | 7/2006 | Fujiwara et al. | |
| 2002/0067677 | A1 * | 6/2002 | Miyashita et al. | 369/59.22 |
| 2002/0071194 | A1 | 6/2002 | Honma | |
| 2002/0101674 | A1 * | 8/2002 | Ichihara et al. | 360/60 |

FOREIGN PATENT DOCUMENTS

| | | |
|---|---|---|
| JP | 09-330565 | 12/1997 |
| JP | 10-091965 | 4/1998 |
| JP | 2000-30376 | 1/2000 |
| JP | 2000-285612 | 10/2000 |
| JP | 2001-035095 | 2/2001 |
| JP | 2002-175673 | 6/2002 |
| JP | 2002-269924 | 9/2002 |

OTHER PUBLICATIONS

Adaptive Partial-Response Maximum-Likelihood Detection in Optical Recording Media, Naoki Ide, Department2, Optical Disc Development Division, AV?IT Development Group, Sony Corporation, pp. 269-270.

* cited by examiner

*Primary Examiner*—William Korzuch
*Assistant Examiner*—Nathan Danielsen
(74) *Attorney, Agent, or Firm*—Antonelli, Terry, Stout & Kraus, LLP.

(57) ABSTRACT

Disclosed herewith is an information reproducing method for realizing significant expansion of disk capacity and processing signals having different minimum run lengths, as well as an optical disk drive that uses the method. To achieve the above objects, a PRML method is used. According to the method, a compensation value is added to an initial target value decided by a convolution operation of NN bits according to a bit array consisting of N bits (N>NN) to obtain a new target value, which is then compared with each of reproduced signals sequentially to select a bit array in which the error between the reproduced signal and the target signal is minimized most likely, then the selected bit array is binarized.

10 Claims, 18 Drawing Sheets

FIG. 1

| | METHOD-1 | METHOD-2 | NEW METHOD |
|---|---|---|---|
| MAIN FUNCTION | CONVENTIONAL (METHOD) | COMPENSATES ASYMMETRY | COMPENSATES NON-LINEAR SHIFTS |
| CONFIGURATION PR(1,1) | 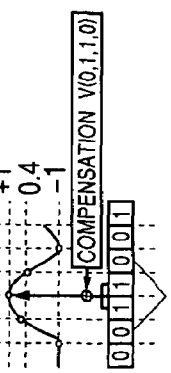 | 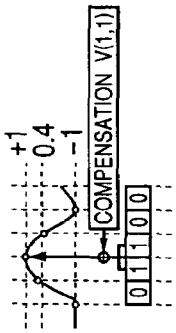 | 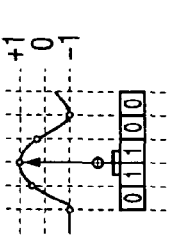 |
| NUMBER OF LEVELS | 3 | 3 | 3 |
| PATTERN COMPENSATION BITS | 0 | 0 | $2(=1+1)$ |
| NUMBER OF COMPENSATION VALUES (V) | 0 | $4(=2^2)$ | $16(=2^4)$ |
| FUNCTION — ASYMMETRY | × | ○ | ○ |
| FUNCTION — INTER-SYMBOL INTERFERENCE | × | × | ○ |
| EXPERIMENTAL RESULTS Tw = 57nm 100Mbps | 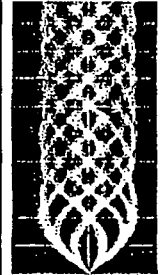 BIT ERROR RATE = $50 \times 10^{-4}$ 2T S/N = 3.6dB | 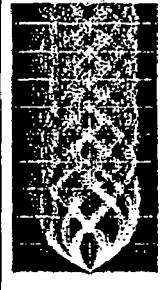 BIT ERROR RATE = $15 \times 10^{-4}$ 2T S/N = 6.1dB |  BIT ERROR RATE $< 0.05 \times 10^{-4}$ 2T S/N = 9.5dB |

| CLASS-BIT | CLASS EXPRESSION | BIT-ARRAY | NUMBER OF STATUS | NUMBER OF LEVELS | CAPACITY (GB) |
|---|---|---|---|---|---|
| 2 | (1,1) | 4 | 2 | 3 | <<23 |
| 3 | (1,2,1) | 6 | 4 | 4 | <28 |
| 4 | (1,3,3,1) | 10 | 6 | 7 | <29 |
| 5 | $(1+D)^4$ | 16 | 10 | 10 | <29 |
| 6 | $(1+D)^5$ | 26 | 16 | 15 | <31 |
| 7 | $(1+D)^6$ | 42 | 26 | 22 | <31 |

| CLASS-BIT | CLASS EXPRESSION | BIT-ARRAY | NUMBER OF STATUS | NUMBER OF LEVELS | CAPACITY (GB) |
|---|---|---|---|---|---|
| 2 | (1,1) | 4 | 2 | 3 | <<23 |
| 3 | (1,2,1) | 6 | 4 | 4 | <28 |
| 4 | (1,2,2,1) | 10 | 6 | 7 | <30 |
| 5 | (1,2,2,2,1) | 16 | 10 | 9 | <31 |
| 6 | (1,2,2,2,2,1) | 26 | 16 | 11 | <25 |
| 7 | (1,2,2,2,2,2,1) | 42 | 26 | 13 | <23 |

| CLASS-BIT | CLASS EXPRESSION | BIT-ARRAY | NUMBER OF STATUS | NUMBER OF LEVELS | CAPACITY (GB) |
|---|---|---|---|---|---|
| 2 | (1,1) | 4 | 3 | 3 | <<23 |
| 3 | (1,1.2,1) | 6 | 4 | 4 | <28 |
| 4 | (1,1.3,1.3,1) | 10 | 6 | 7 | <31 |
| 5 | (1,1.6,1.8,1.6,1) | 16 | 10 | 10 | <32 |
| 6 | (1,1.9,2.5,...) | 26 | 16 | 15 | <30 |
| 7 | (1,2.3,3.6,...) | 42 | 26 | 22 | <27 |

| CLASS EXPRESSION | NUMBER OF BIT-ARRAY | NUMBER OF STATUS | NUMBER OF LEVELS | COMPENSATION BITS | ML BIT |
|---|---|---|---|---|---|
| PR(1,2,2,1) | 10 | 6 | 7 | 0 | 4 |
| COMPENSATED PR(1,2,2,1) | 10 | 6 | 10 | 4 | 4 |
| COMPENSATED PR(0,1,2,2,1,0)ML4 | 26 | 6 | 26 | 6 | 4 |
| COMPENSATED PR(0,1,2,2,1,0) | 26 | 16 | 26 | 6 | 6 |
| COMPENSATED PR(0,0,1,2,2,1,0,0) | 68 | 42 | 68 | 8 | 8 |
| COMPENSATED PR(0,0,0,1,2,2,1,0,0,0) | 178 | 110 | 178 | 10 | 10 |

FIG. 6A

RLL(1,7)
PR(1,2,2,1)
MARK = LOW LEVEL

| NO. | BIT ARRAY | TARGET LEVEL | RLL ERROR |
|---|---|---|---|
| 0 | 0 0 0 0 | 1.00 | |
| 1 | 0 0 0 1 | 0.67 | |
| 2 | 0 0 1 0 | 0.33 | × |
| 3 | 0 0 1 1 | 0.00 | |
| 4 | 0 1 0 0 | 0.33 | × |
| 5 | 0 1 0 1 | 0.00 | × |
| 6 | 0 1 1 0 | −0.33 | |
| 7 | 0 1 1 1 | −0.67 | |
| 8 | 1 0 0 0 | 0.67 | |
| 9 | 1 0 0 1 | 0.33 | |
| 10 | 1 0 1 0 | 0.00 | × |
| 11 | 1 0 1 1 | −0.33 | × |
| 12 | 1 1 0 0 | 0.00 | |
| 13 | 1 1 0 1 | −0.33 | × |
| 14 | 1 1 1 0 | −0.67 | |
| 15 | 1 1 1 1 | −1.00 | |

FIG. 6B

BIT ARRAY NUM = 10
STATE NUM = 6
TARGET LEVEL NUM = 7

| NO. | BIT ARRAY | TARGET LEVEL |
|---|---|---|
| 0 | 0 0 0 0 | 1.00 |
| 1 | 0 0 0 1 | 0.67 |
| 2 | 0 0 1 1 | 0.00 |
| 3 | 0 1 1 0 | −0.33 |
| 4 | 0 1 1 1 | −0.67 |
| 5 | 1 0 0 0 | 0.67 |
| 6 | 1 0 0 1 | 0.33 |
| 7 | 1 1 0 0 | 0.00 |
| 8 | 1 1 1 0 | −0.67 |
| 9 | 1 1 1 1 | −1.00 |

FIG. 7A

RLL(2,10)
PR(3,4,4,3)
MARK = LOW LEVEL

| NO. | BIT ARRAY | TARGET LEVEL | RLL ERROR |
|---|---|---|---|
| 0 | 0 0 0 0 | 1.00 | |
| 1 | 0 0 0 1 | 0.57 | |
| 2 | 0 0 1 0 | 0.43 | × |
| 3 | 0 0 1 1 | 0.00 | |
| 4 | 0 1 0 0 | 0.43 | × |
| 5 | 0 1 0 1 | 0.00 | × |
| 6 | 0 1 1 0 | −0.14 | × |
| 7 | 0 1 1 1 | −0.57 | |
| 8 | 1 0 0 0 | 0.57 | |
| 9 | 1 0 0 1 | 0.14 | × |
| 10 | 1 0 1 0 | 0.00 | × |
| 11 | 1 0 1 1 | −0.43 | × |
| 12 | 1 1 0 0 | 0.00 | |
| 13 | 1 1 0 1 | −0.43 | × |
| 14 | 1 1 1 0 | −0.57 | |
| 15 | 1 1 1 1 | −1.00 | |

FIG. 7B

BIT ARRAY NUM = 8
STATE NUM = 6
TARGET LEVEL NUM = 5

| NO. | BIT ARRAY | TARGET LEVEL |
|---|---|---|
| 0 | 0 0 0 0 | 1.00 |
| 1 | 0 0 0 1 | 0.57 |
| 2 | 0 0 1 1 | 0.00 |
| 3 | 0 1 1 1 | −0.57 |
| 4 | 1 0 0 0 | 0.57 |
| 5 | 1 1 0 0 | 0.00 |
| 6 | 1 1 1 0 | −0.57 |
| 7 | 1 1 1 1 | −1.00 |

FIG. 8

RLL(1,7)
COMPENSATED PR(1,2,2,1)
MARK = LOW LEVEL

| NO. | BIT ARRAY | RLL(1,7) PR(1,2,2,1) | RLL(2,10) PR(3,4,4,3) | | |
|---|---|---|---|---|---|
| | | INITIAL TARGET | INITIAL TARGET | RLL ERROR | RLL COMPENSATION VALUE |
| 0 | 0 0 0 0 | 1.000 | 1.000 | | 0.000 |
| 1 | 0 0 0 1 | 0.667 | 0.571 | | −0.095 |
| 2 | 0 0 1 1 | 0.000 | 0.000 | | 0.000 |
| 3 | 0 1 1 0 | −0.333 | −0.143 | × | ∞ |
| 4 | 0 1 1 1 | −0.667 | −0.571 | | 0.095 |
| 5 | 1 0 0 0 | 0.667 | 0.571 | | −0.095 |
| 6 | 1 0 0 1 | 0.333 | 0.143 | × | ∞ |
| 7 | 1 1 0 0 | 0.000 | 0.000 | | 0.000 |
| 8 | 1 1 1 0 | −0.667 | −0.571 | | 0.095 |
| 9 | 1 1 1 1 | −1.000 | −1.000 | | 0.000 |

FIG. 9

RLL(1,7)
COMPENSATED PR(1,2,2,1)
MARK = LOW LEVEL

| NO. | BIT ARRAY | INITIAL TARGETS | COMPENSATION VALUE | COMPENSATION TARGET |
|---|---|---|---|---|
| 0 | 0 0 0 0 | 1.000 | 0.180 | 1.18 |
| 1 | 0 0 0 1 | 0.667 | −0.145 | 0.52 |
| 2 | 0 0 1 1 | 0.000 | −0.051 | −0.05 |
| 3 | 0 1 1 0 | −0.333 | 0.276 | −0.06 |
| 4 | 0 1 1 1 | −0.667 | 0.094 | −0.57 |
| 5 | 1 0 0 0 | 0.667 | −0.145 | 0.52 |
| 6 | 1 0 0 1 | 0.333 | −0.372 | −0.04 |
| 7 | 1 1 0 0 | 0.000 | −0.050 | −0.05 |
| 8 | 1 1 1 0 | −0.667 | 0.076 | −0.59 |
| 9 | 1 1 1 1 | −1.000 | 0.090 | −0.91 |

FIG. 10

RLL(1,7)
COMPENSATED PR(0,1,2,2,1,0)
MARK = LOW LEVEL

| NO. | BIT ARRAY | | | INITIAL TARGET PR(1,2,2,1) | COMPENSATION VALUES (6 BITS) | COMPENSATED TARGETS |
|---|---|---|---|---|---|---|
| | COMPENSATION BIT | PR(1,2,2,1) | COMPENSATION BIT | | | |
| 0  | 0 | 0 0 0 0 | 0 | 1.00  | 0.494  | 1.494  |
| 1  | 0 | 0 0 0 0 | 1 | 1.00  | 0.203  | 1.203  |
| 2  | 0 | 0 0 0 1 | 1 | 0.67  | −0.026 | 0.641  |
| 3  | 0 | 0 0 1 1 | 0 | 0.00  | 0.129  | 0.129  |
| 4  | 0 | 0 0 1 1 | 1 | 0.00  | −0.056 | −0.056 |
| 5  | 0 | 0 1 1 0 | 0 | −0.33 | 0.276  | −0.057 |
| 6  | 0 | 0 1 1 1 | 0 | −0.67 | 0.128  | −0.539 |
| 7  | 0 | 0 1 1 1 | 1 | −0.67 | 0.077  | −0.590 |
| 8  | 0 | 1 1 0 0 | 0 | 0.00  | 0.133  | 0.133  |
| 9  | 0 | 1 1 0 0 | 1 | 0.00  | −0.019 | −0.019 |
| 10 | 0 | 1 1 1 0 | 0 | −0.67 | 0.137  | −0.530 |
| 11 | 0 | 1 1 1 1 | 0 | −1.00 | 0.121  | −0.879 |
| 12 | 0 | 1 1 1 1 | 1 | −1.00 | 0.118  | −0.882 |
| 13 | 1 | 0 0 0 0 | 0 | 1.00  | 0.494  | 1.494  |
| 14 | 1 | 0 0 0 0 | 1 | 1.00  | 0.203  | 1.203  |
| 15 | 1 | 0 0 0 1 | 1 | 0.67  | −0.026 | 0.641  |
| 16 | 1 | 0 0 1 1 | 0 | 0.00  | 0.129  | 0.129  |
| 17 | 1 | 0 0 1 1 | 1 | 0.00  | −0.056 | −0.056 |
| 18 | 1 | 1 0 0 0 | 0 | 0.67  | −0.145 | 0.522  |
| 19 | 1 | 1 0 0 0 | 1 | 0.67  | −0.145 | 0.522  |
| 20 | 1 | 1 0 0 1 | 1 | 0.33  | −0.372 | −0.039 |
| 21 | 1 | 1 1 0 0 | 0 | 0.00  | 0.133  | 0.133  |
| 22 | 1 | 1 1 0 0 | 1 | 0.00  | −0.019 | −0.019 |
| 23 | 1 | 1 1 1 0 | 0 | −0.67 | 0.137  | −0.530 |
| 24 | 1 | 1 1 1 1 | 0 | −1.00 | 0.121  | −0.879 |
| 25 | 1 | 1 1 1 1 | 1 | −1.00 | 0.118  | −0.882 |

FIG. 16

RLL(1,7)
COMPENSATED PR(0,1,2,2,1,0)
MARK = LOW LEVEL

| NO. | BIT ARRAY | RLL(1,7) COMPENSATED PR(0,1,2,2,1,0) | | RLL(2,10) PR(3,4,4,3) | | |
|---|---|---|---|---|---|---|
| | | INITIAL TARGETS | COMPEN-SATION VALUES | INITIAL TARGETS | RLL ERROR | RLL COMPEN-SATION |
| 0 | 0 0 0 0 0 0 | 1.000 | a | 1.000 | | 0.000 |
| 1 | 0 0 0 0 0 1 | 1.000 | b | 1.000 | | 0.000 |
| 2 | 0 0 0 0 1 1 | 0.667 | c | 0.571 | | 0.095 |
| 3 | 0 0 0 1 1 0 | 0.000 | d | 0.000 | × | ∞ |
| 4 | 0 0 0 1 1 1 | 0.000 | e | 0.000 | | 0.000 |
| 5 | 0 0 1 1 0 0 | −0.333 | f | −0.143 | × | ∞ |
| 6 | 0 0 1 1 1 0 | −0.667 | g | −0.571 | | −0.095 |
| 7 | 0 0 1 1 1 1 | −0.667 | h | −0.571 | | −0.095 |
| 8 | 0 1 1 0 0 0 | 0.000 | i | 0.000 | × | ∞ |
| 9 | 0 1 1 0 0 1 | 0.000 | j | 0.000 | × | ∞ |
| 10 | 0 1 1 1 0 0 | −0.667 | k | −0.571 | | −0.095 |
| 11 | 0 1 1 1 1 0 | −1.000 | l | −1.000 | | 0.000 |
| 12 | 0 1 1 1 1 1 | −1.000 | m | −1.000 | | 0.000 |
| 13 | 1 0 0 0 0 0 | 1.000 | n | 1.000 | | 0.000 |
| 14 | 1 0 0 0 0 1 | 1.000 | o | 1.000 | | 0.000 |
| 15 | 1 0 0 0 1 1 | 0.667 | p | 0.571 | | 0.095 |
| 16 | 1 0 0 1 1 0 | 0.000 | q | 0.000 | × | ∞ |
| 17 | 1 0 0 1 1 1 | 0.000 | r | 0.000 | × | ∞ |
| 18 | 1 1 0 0 0 0 | 0.667 | s | 0.571 | | 0.095 |
| 19 | 1 1 0 0 0 1 | 0.667 | t | 0.571 | | 0.095 |
| 20 | 1 1 0 0 1 1 | 0.333 | u | 0.143 | × | ∞ |
| 21 | 1 1 1 0 0 0 | 0.000 | v | 0.000 | | 0.000 |
| 22 | 1 1 1 0 0 1 | 0.000 | w | 0.000 | × | ∞ |
| 23 | 1 1 1 1 0 0 | −0.667 | x | −0.571 | | −0.095 |
| 24 | 1 1 1 1 1 0 | −1.000 | y | −1.000 | | 0.000 |
| 25 | 1 1 1 1 1 1 | −1.000 | z | −1.000 | | 0.000 |

INFORMATION REPRODUCING METHOD AND AN INFORMATION REPRODUCING DRIVE UTILIZING PRML TO OUTPUT BINARY VALUES

BACKGROUND OF THE INVENTION

1. Field of the Invention

The present invention relates to an information reproducing method that uses replaceable optical disks and an information reproducing apparatus that employs the method.

2. Description of Related Art

The use of such optical disks as CD and DVD is now widespread and development of next generation optical disks that use a blue laser also makes rapid progress to meet the demand of users for increasing the capacity of those disks more and more. And, it has become common now for one optical disk player to be provided with functions of not only reproducing information from CD disks or from both of CD and DVD disks, but also recording information on all of CD-R/RW, DVD-RAM, and DVD-R/RW disks. And accordingly, the users have come now to demand the compatibility of recording/reproducing functions among those optical disks manufactured in various standards to be more improved.

The PRML (Partial Response Maximum Likelihood) method, which is remarkably effective for improving the S/N ratio, is now widespread as means for expanding the capacity of magnetic disks. The PRML method compares reproduced signals with a target signal sequentially for a continuous N time to transform each reproduced signal bit array to the most likelihood binary bit array. Conventionally, a direct slicing method has long been employed to reproduce information from optical disks. However, the conventional method has its limit in speeding up the processing and expanding the disk capacity. This is why the PRML method has come to be employed as means for reproducing information from those optical disks.

In spite of such an advantage, the PRML method has been confronted with the following three problems that must be solved before the method is to be used positively as means for reproducing information from optical disks.

The first problem is asymmetry occurrence. A PRML target signal is calculated by a convolution processing of a specified impulse response (PR class) and a bit array, so that the PRML target value becomes symmetrical vertically to the center value. On the other hand, each optical disk usually generates asymmetry to improve the S/N ratio. As a result, the reproduced signal level becomes asymmetrical and hardly matches with the PRML target signal.

The second problem is an impossibility to realize significant expansion of disk capacity. There has never been proposed any method for such significant expansion of disk capacity with use of the PRML method so far. This point will be described later in detail.

The third problem is the minimum run length. The PRML basic structure is decided uniquely by a PR class and the run length of a reproduced signal. However, the minimum run length of MO disks (optical disks in the next generation) is 2T while that of the CD/DVD disks is 3T. Consequently, to enable one optical disk drive to correspond to such a plurality of optical disk types, the drive must also be provided with a plurality of PRML circuits.

Technical Digest of ISOM 2002 (269-271 (2002)) discloses an application example of the PRML method to an optical disk. In the document, a target signal level is changed according to the circumstances to reproduce information from the optical disk while the disk tilts in both radial and tangential directions. This method is excellent, since it can solve the first problem described above (asymmetry occurrence). However, the method is still difficult to solve the second problem (impossibility to realize significant expansion of disk capacity) and cannot solve the third problem (impossibility to process signals having different minimum run lengths in the same way).

[Non-Patent Document 1]

Technical Digest of ISOM 2002 (269-271 (2002))

As described above, the conventional PRML method is hardly effective to expand the capacity of optical disks significantly and cannot process signals having different minimum run lengths in the same way.

Under such circumstances, it is an object of the present invention to provide an information reproducing method that can solve the above conventional technical problems, realize significant expansion of disk capacity, and process signals having different minimum run lengths in the same way, as well as an information reproducing apparatus that employs the method.

SUMMARY OF THE INVENTION

At first, a description will be made for the PRML method employed to expand the capacity of optical disks significantly. As described above, a target signal of this PRML method is decided by a selected PR class and a reproduced signal. Therefore, the inventor et al have tested the difference of high density recording performance among PR classes by recording signals having different recording density values on one optical disk. The optical disk used for the test is formed by laminating phase-change films on a substrate structured so as to have lands and grooves at track pitches of 0.34 um. A DDU-1000 optical disk evaluator (PulseTech Products Corporation) was used for the test. The wavelength of the light source was 405 nm and the NA of the objective lens was 0.85. The RLL (1, 7) was used as a demodulation code and the width of the detection window was changed within a range of 53 nm to 80 nm. The recording capacity of one sided CD-size disk was assumed as 35 GB for the calculation at Tw=53 nm. The following three series were selected to examine the difference among PR classes.

(1) $(1+D)^n$ Series

This is the most basic class series consisting of PR(1, 1), PR(1, 2, 1), PR(1, 3, 3, 1), .

(2) (1, 2, . . . , 2, 1) Series

This series includes the PR (1, 2, 2, 1) series that is often used for optical disks. The high range emphasis is less than that of the above series (1) while it is expected to improve the S/N ratio.

(3) Impulse Response Approximation Series

A PR class is basically a approximation impulse response of a reproducing head. The PR class used here is obtained by calculating an impulse of an optical head with use of an optical simulator.

Each selected PR class and the above described optical simulator were used to calculate idealistic reproduced signals, which were then used to reproduce signals from the above described optical disk while the equalizing conditions were decided for each PR class so as to minimize the squared error between target and each reproduced signal. The number of taps of the equalizer was 11.

FIG. 2A through FIG. 4 show measurement results of the reproduction performance of the sample optical disk with respect to each PR class series.

FIG. 2A shows a relationship between the recording capacity and the bit error rate with respect to the $(1+D)^n$ series. FIG. 2B shows a table for storing set values of bit-expression of each PR class, the number of effective bit arrays, the number of effective states, the number of independent target levels, and capacity upper limit. The capacity upper limit denotes a range in which the bit error rate is $10^{-4}$ and under. If the number of class bits (the number of elements included in the PR class expression) is assumed as N, the total number of bit arrays becomes $2^N$. However, because of the run length limitation, the number of effective bit arrays becomes a value obtained by subtracting bit arrays that have the minimum run length of 1T respectively from a set of bit arrays. The number of effective states is also obtained similarly. And, because a circuit scale is proportional to the number of effective bit arrays to express those numbers, the number of class bits should preferably be as less as possible. Although the more the number of class bits is, the more the performance improvement hits the ceiling when the number of class bits reaches 6 and over. The maximum capacity becomes 31 GB when the number of class bits is 7.

FIG. 3A shows a relationship between the recording capacity and the bit error rate with respect to the series (1, 2, ..., 2, 1). FIG. 3B shows the details of the relationship. In this series, if the number of class bits is excessively large, the capacity is reduced. This is because the reproduced signal changes with time can be expressed more accurately when the number of class bits is large such way, the number of independent target levels also increases at that time, thereby, the difference between target levels with respect to two different paths decreases and the number of errors to occur at the time of path selection increases. The maximum recording capacity of this series becomes 31 GB when the number of class bits is 5.

FIG. 4A shows a relationship between the recording capacity and the bit error rate with respect to the impulse response approximation series. FIG. 4B shows the details of the relationship. The recording capacity of this series is also reduced when the number of class bits increases excessively. The maximum recording capacity of this series becomes 32 GB when the number of class bits is 5.

From the results of the examination for the possible three types of PR class series, it has been found that the performance improvement has its limit in any complicated configuration of the optical disk drive. This is because each reproduced signal from the optical disk comes to have a non-linear edge shift caused by the inter-code interference caused by the light spot shape and the thermal interference when in reproducing. And, in order to cope with such a non-linear inter-symbol interference and such an edge shift, the basic PRML method that decides a target value by a linear convolution processing is insufficient, so that the non-linear component must be compensated by some means or other. To realize a higher recording density, therefore, the following two points come to be very important.
(1) The number of class bits is prevented from increasing so as not to increase the number of target levels.
(2) A compensation value is added to a target value that is decided by a convolution processing according to the subject bit array to compensate the target value, thereby coping with each non-linear component included in each reproduced signal.

To satisfy those requirements and realize significant expansion of optical disk capacity, the PRML method may be used. The PRML method adds a compensation value to a target value decided by a convolution operation of NN bits according to the N-bit (N>NN) bit array to obtain a new target value, then compares the new target value with each reproduced signal to transform a bit array selected from the N-bit bit arrays to a most likelihood binary bit array, in which the error between the reproduced signal and the target value is minimized.

Next, a description will be made for a method that can process signals having different minimum run lengths in the same way. At first, a description will be made for a case in which an RLL (1, 7) modulated signal (the minimum run length: 2T) used for MO disks (next generation optical disks) is reproduced with the PR class PR(1,2,2,1). In this connection, because the number of class bits becomes 4, the number of bit arrays becomes 16 ($=2^4$). FIG. 6A shows target level values for those 16 bit arrays. Generally, the reflection rate of the recording marks having a digital value "1" respectively is low while the reflection rate of the recording marks having a digital value "0" is high on optical disks. In this case, signals are standardized so that the target level of the bit array "0000" becomes "+1" and the target level of the bit array "1111" becomes "−1". Hereinafter, note that the same standardization will apply to each description that uses a class target value. In FIG. 6, if the minimum run length in a bit array is less than 2T, a run length limit error occurs in the bit array. In FIG. 6A, such a run length limit error occurs in 6 bit arrays. FIG. 6B collects the bit arrays, in each of which no run length limit error occurs. Thus, PR class PR (1, 2, 2, 1) with the minimum run length 2T can be expressed in a total of 10 bit arrays. In the prescriptive expression of the PRML method, the number of states becomes 6 and the number of target levels becomes 7.

On the other hand, the minimum run length of CD/DVD disks is 3T. Now, a description will be made for how to reproduce signals having such a 3T run length with the PR class PR(3, 4, 4, 3). FIG. 7A shows target levels for all the bit arrays. The run length limit error occurs in eight of those bit arrays. FIG. 7B shows only the effective bit arrays extracted from all the bit arrays. The PR class PR (3, 4, 4, 3) with the minimum run length 3T can be expressed in eight bit arrays. The number of states becomes 6 and the number of target levels becomes 5 in the expression of the PRML method.

In the comparison between FIG. 6B and FIG. 7B, the number of bit arrays and the number of target levels in FIG. 6B do not match with those in FIG. 7B. If a circuit is configured in accordance with either of the methods, only the signals in one method are reproduced; the signals in the other method cannot be reproduced. However, the present invention enables signals of both 2T and 3T run lengths to be reproduced with one method if the difference between FIG. 6B and FIG. 7B is handled as a non-linear shift, since the present invention can compensate such a non-linear shift. The method can be summarized as follows.
(1) One of the two methods, which handles signals that are shorter in minimum run length (PLL(1, 7), PR(1, 2, 2, 1)), is selected as the basic method.
(2) A compensation value is added to a target value decided by the convolution of a bit array and each PR class coefficient according to the subject bit array and the result is used as a new target value.
(3) The following conditions are used to reproduce signals that are shorter in minimum run length (PLL(1,7)).
(4) When reproducing signals that are longer in minimum run length (RLL(2,10), PR(3,4,4,3)), the difference between the target value of the shorter smaller minimum run length (RLL(1,7), PR(1,2,2,1)) and the target value of the longer minimum run length is used as a compensation value corresponding to the subject bit array. At the same time, because there are always bit arrays in which a run length limit error occurs respectively, a compensation value (regardless of the sign type (positive/negative) large enough with respect to the amplitude of the reproduced signal is used so as to obtain a difference between the target value and the signal, which is large enough to satisfy the run length limit practically.

According to the present invention, non-linear components included in each reproduced signal are suppressed and the S/N ratio is improved practically, so that the present invention can realize both significant expansion of disk capacity and correspondence to signals having different minimum run lengths.

BRIEF DESCRIPTION OF THE DRAWINGS

FIG. 1 is a table for describing the basic concept of an information reproducing method of the present invention;

FIG. 6A and FIG. 6B are tables for denoting a relationship between the bit array and the target value for reproducing RLL (1, 7) modulated signals (minimum run length: 2T) with use of the PR class PR(1,2,2,1);

FIG. 7A and FIG. 7B are tables for denoting a relationship between the bit array and the target value for reproducing RLL (2,10) modulated signals (minimum run length: 3T) with use of the PR class PR(3,4,4,3);

FIG. 8 is a run length limit compensation table for storing set values used to reproduce signals with the minimum run length 3T with use of the compensated PR(1,2,2,1) method for the minimum run length 2T of the present invention;

FIG. 9 is a table for storing initial target values, compensation values, and compensated target values with respect to the conventional compensated PR(1, 2,2,1) method;

FIG. 10 is a table for storing initial target values, compensation values, and compensated target values with respect to the compensated PR(0,1,2,2,1,0) method of the present invention;

FIG. 16 is a run length limit compensation table for storing set values used to reproduce signals of the minimum run length 3T with use of the minimum run length 2T compensated PR(0,1,2,2,1,0) method of the present invention;

DETAILED DESCRIPTION OF THE PREFERRED EMBODIMENTS

Figures 2A, 2B:
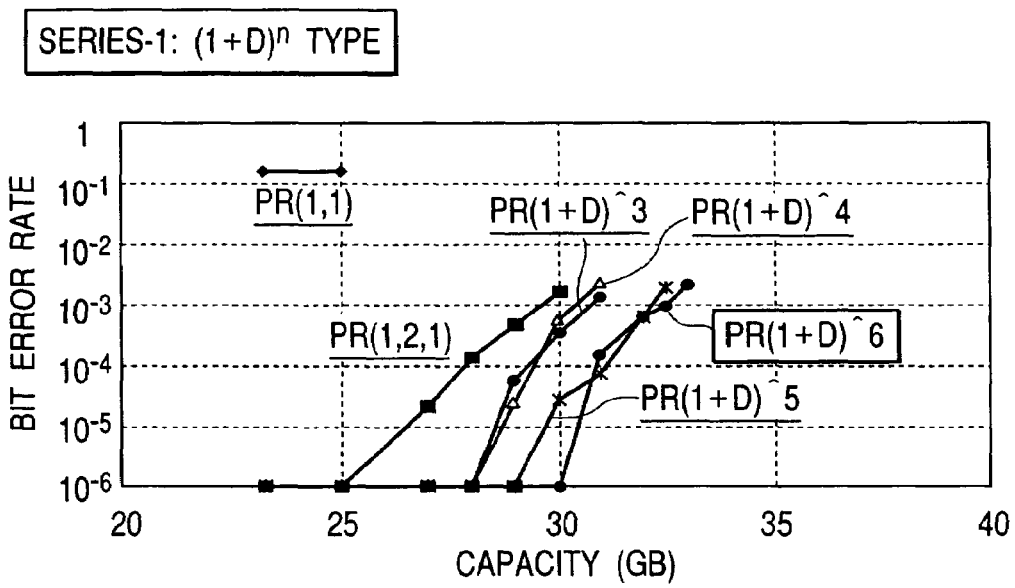
FIG. 2A and FIG. 2B are respectively a graph and a table of test results for denoting a relationship between the recording capacity and the bit error rate with respect to a $(1+D)^n$ PR class series.
Figures 3A, 3B:
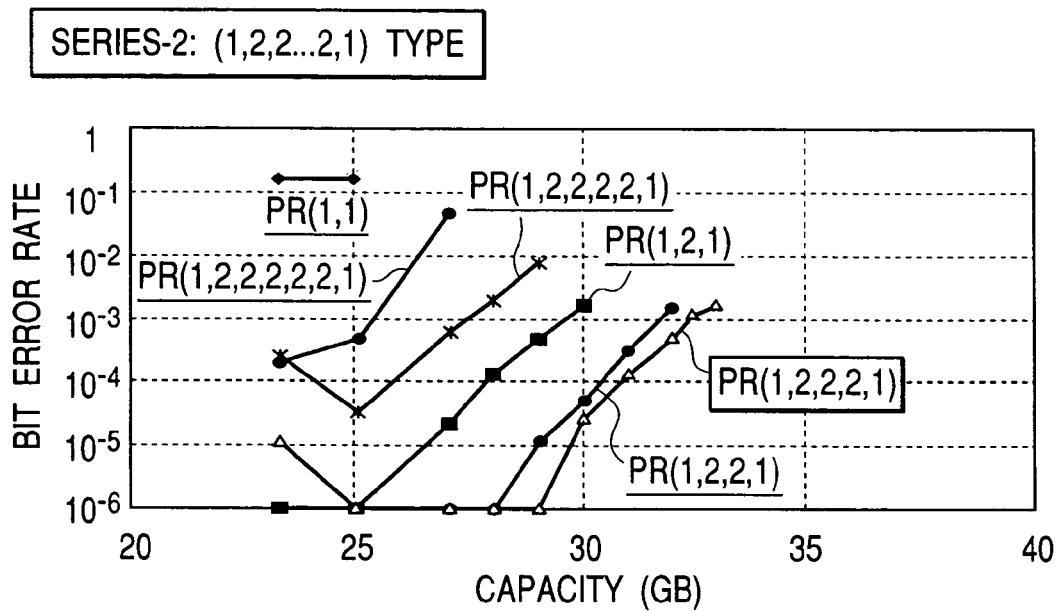
FIG. 3A and FIG. 3B are respectively a graph and a table of test results for denoting a relationship between the recording capacity and the bit error rate with respect to a $(1, 2, \ldots, 2, 1)$PR class series.
Figures 4A, 4B:
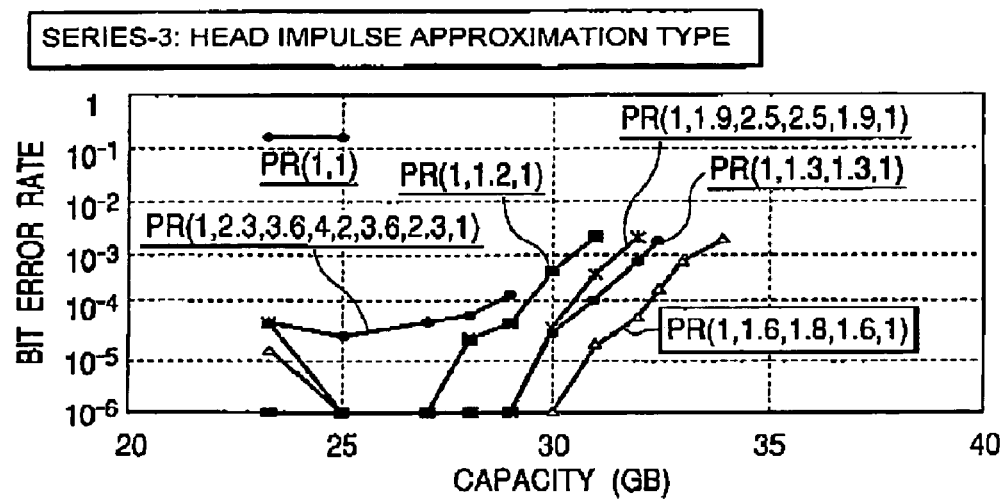
FIG. 4A and FIG. 4B are respectively a graph and a table of test results for denoting a relationship between the recording capacity and the bit error rate with respect to an impulse response likelihood PR class series.

Hereunder, the preferred embodiments of the present invention will be described with reference to the accompanying drawings.

FIG. 1 shows the basic concept of an information reproducing method of the present invention. In order to simplify the description, the most basic class PR (1,1) will be picked up as the subject here. Method 1 is the basic PRML (conventional) method. As shown in the configuration example, each reproduced signal is compared with a target value with respect to the bit arrays for two consecutive times to select a bit array having the minimized error. In this example, the number of target levels is 3 and the method cannot solve the problems of asymmetry occurrence and non-linear inter-symbol interference of reproduced signals.

Method 2 is the PRML method disclosed in the Technical Digest of ISOM 2002 (269-271 (2002)). In this method, a compensation value V corresponding to a 2-bit bit array is added to a target value decided by a convolution operation to obtain a new target value, which is then used to select a bit array that minimizes the error from the value of the reproduced signal while transforming the bit array to a binary one. The number of compensation values V becomes $4(2^2)$. This method can change the target value suitably corresponding to the asymmetry of the reproduced signals, but cannot remove the non-linear inter-symbol interference completely.

In the method of the present invention, a pattern compensation bit is added both before and after each PR(1,1) bit array. Unlike the method 2, this method is characterized in that a compensation value V is added to a target value corresponding to a 4-bit bit array to which two pattern compensation bits are added. Then, the target value corresponding to the 4-bit bit array is compared with each reproduced signal to select a bit array in which the error is minimized sequentially, then transform the selected bit array to a binary one. In this method, the number of compensation values V is 16 ($=2^4$) while the number of target levels is kept at 3, so that the non-linear inter-symbol interference can be compensated within a range of the 4-bit bit array.

As described above, the present invention realizes significant expansion of disk capacity as follows.

(1) The number of class bits is suppressed from increasing so as not to increase the number of target levels.

(2) A compensation value corresponding to the subject bit array is added to a target value decided by a convolution operation to compensate the target value, thereby removing non-linear components included in each reproduced signal.

Basically, this method that satisfies the above two conditions is also the basic PRML method. However, the method is characterized in that a target value is decided with two bits. This method can thus remove non-linear components without increasing the number of target levels.

To distinguish this method from the conventional PRML method, the PR class expression will be described as compensated PR(0,1,1,0). In this method, the number of class bits is 4 just like in the PRML method and each target value is calculated by a convolution operation of a coefficient array (0,1,1,0) and a 4-bit bit array just like in the conventional description. However, the coefficient of each of the bits at both ends is zero, so that it becomes the same as the target value decided with a 2-bit coefficient array (1,1). The coefficient "0" placed at both ends denotes pattern compensation bits and the compensated PR means addition of a compensation value V decided by a 4-bit bit array to a target value. Similarly, the conventional method 1 can be expressed as PR(1,1) while the method 2 can be described as compensated PR(1,1).

The test results shown in FIG. 6 are obtained when signals having different recording density values are recorded on an optical disk and reproduced with each of the methods described above. The test conditions are as follows. The optical disk used in the test is formed by laminating phase-change films on a substrate structured so as to have lands and grooves at track pitches of 0.34 μm. A DDU-1000 type optical disk evaluator manufactured by PulseTech Products Corporation was used for the test. The wavelength of the light source was 405 nm and the objective lens NA was 0.85. The RLL(1, 7) was used as the modulation code and the detection window width Tw was changed within a range of 53 to 80 nm. The recording capacity of one side of a CD-size disk was assumed as 35 GB at Tw=53 nm. The test results shown in FIG. 6 were obtained at Tw=57 nm and basic PR class=PR(1,2,2,1) when the recording capacity was 32.5 GB and information was reproduced from the optical disk at a data transfer rate of 100 Mbps. The bit error rate was $50 \times 10^{-4}$ in the method 1 (PR(1,2,2,1)), $15 \times 10^{-4}$ in the method 2 (compensated PR(1,2,2,1)), and $0.05 \times 10^{-4}$ in this method (compensated PR(0,1,2,2,1,0). It was thus assured that this method could suppress the bit error rate at $\frac{1}{100}$ and under. In addition, the reproduced signal eye-pattern denotes that of each practical signal (compensated reproduced signal) when each of the above methods is used. In this method, it is confirmed that the eye is opened clearly. The S/N ratio of each 2Tw signal included in each compensated reproduced signal was 3.6 dB in the method 1, 6.1 dB in the method 2, and 9.5 dB in this method. The details of the compensated reproduced signal will be described later.

FIG. 5 shows test results of the difference of capacity expansion performance between the method of the present invention and the conventional method. The PR(1,2,2,1) was selected as the basic PR class in the test. The allowable value of the bit error rate was assumed as $10^{-4}$ to obtain the upper limit of the recording capacity. The recording capacity upper limit of the conventional method was 30 GB at PR(1,2,2,1) and 32 GB at compensated PR(1,2,2,1). The recording capacity upper limit of the present invention method was 32.5 GB at compensated PR(0,1,2,2,1,0)ML4, 34.5 GB at compensated PR(0,1,2,2,1,0), and 35 GB and over at compensated PR(0,0,1,2,2,1,0,0) and compensated PR(0,0,0,1,2,2,1,0,0,0) respectively. The compensated PR(0,1,2,2,1,0) ML4 denotes a method in which 6 bits were used to decide only a compensation value while the number of bits used for the most likelihood composite processing to select the most likelihood bit array was kept at 4 bits. This method obtained better test results than the conventional method. However, because the most likelihood composite processing was done without including any pattern compensation bit in a bit array, the non-linear shift could not be suppressed satisfactorily. This is why the most likelihood composite processing in which pattern compensation bits are included becomes very important to bring out the capability of the PRML method of the present invention. The test results obtained here are effective to increase the recording capacity more than the case in which the basic PR class is PR(1,2,2,1) and other cases of the various PR classes that use the conventional PRML methods shown in FIG. 2A through FIG. 4.

Figures 5A, 5B:
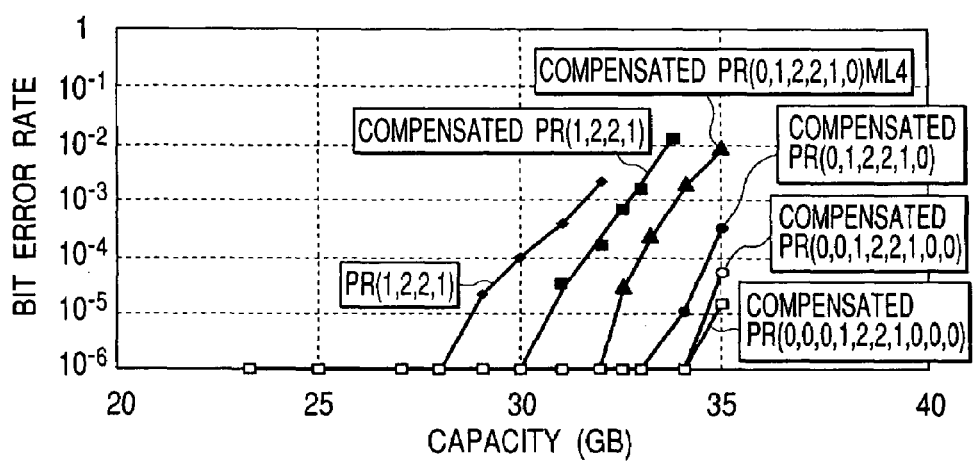
FIG. 5A and FIG. 5B are respectively a graph and a table of test results for denoting a difference of capacity expansion capability between the present invention and the conventional one.

FIG. 5B shows the number of bit arrays, the number of states, the number of levels, the number of pattern compensation bits, and the number of ML bits with respect to each of the methods shown in FIG. 5A. The scale of a circuit for employing the PRML method is roughly proportional to the number of bit arrays, so that the circuit scale must be expanded more than 10 times that of the PR(1,2,2,1) method to realize a compensated PR(0,0,01,2,2,1,0,0,0) class in which 3 pattern compensated bits are added to each of the ends. Because the present invention can reproduce signals having different run lengths, the circuit scale, if it is three times or so and can improve the performance, could be considered to be proper, since both PR(1,2,2,1) and PR(3,4,4,3) classes have been required to be mounted conventionally to enable the compatibility among reproduced signals having different minimum run lengths. Considering those various requirements described above, the compensated PR(1,2,2,1,0) class in which two pattern compensated bits are added might be the best selection practically.

While a description has been made so far for a method that selects PR(1,2,2,1) as the basic PR class and adds the same number of pattern compensation bits to both before and after each bit array, the present invention is not limited only to that; any other basic class, for example, PR(1,1), PR(1,2,1), PR(3,4,4,3), PR(1,1,1,1), PR(1,2,2,2,1), etc. may be selected. The number of pattern compensation bits may not be the same before and after each bit array; they may be asymmetrical, such as compensated PR(0,1, 2,2,1), PR(0,0,1,2,2,1), compensated PR(1,2,2,1,0), compensated PR(1,2,2,1,0,0), etc. For example, if a signal in which it is clear that the recording time thermal interference is concentrated physically at the front edge is to be reproduced, it would be best to add a pattern compensation bit only at the front side sometimes.

FIGS. 9 and 10 show compensation values V used for the test performance shown in FIG. 1. FIG. 9 shows initial target values with respect to the conventional compensated PR(1,2,2,1) method (obtained by each convolution operation of a bit array and a PR class coefficient array), compensated values corresponding to bits arrays, and compensated target values, each obtained by adding a compensation value to an initial target value. 0.180 is added to a bit array "0000" corresponding to a long space while 0.090 is added to a bit array "1111" corresponding to a long mark. As to be understood clearly from the eye pattern of the method 1 of the test results shown in FIG. 1, it denotes a result corresponding to an asymmetrical pattern in which a 2T signal comes lower than the center of the signal amplitude.

FIG. 10 shows a table of initial target values, compensation values, and compensation target values with respect to the compensated PR(0,1,2,2,1,0) class of the present invention. In this table, the compensation value of the bit array No.3"000110" is 0.129 while the compensation value of the bit array No.4"000111" is −0.056. The former corresponds to a 2Tw mark while the latter corresponds to a mark of 3Tw and over. This compensation value difference is caused by adaptation of the compensated PR(0,1,2,2,1,0) class to a non-linear shift between a 2Tw mark and a mark of 3Tw and over.

The conventional PRML method, which has no pattern compensation bits, cannot correspond to the non-linear shift like that.

FIGS. 11 through 15 show a block diagram for realizing each PRML method block of the optical disk unit that employs the information reproducing method of the present invention respectively.

Figure 11:
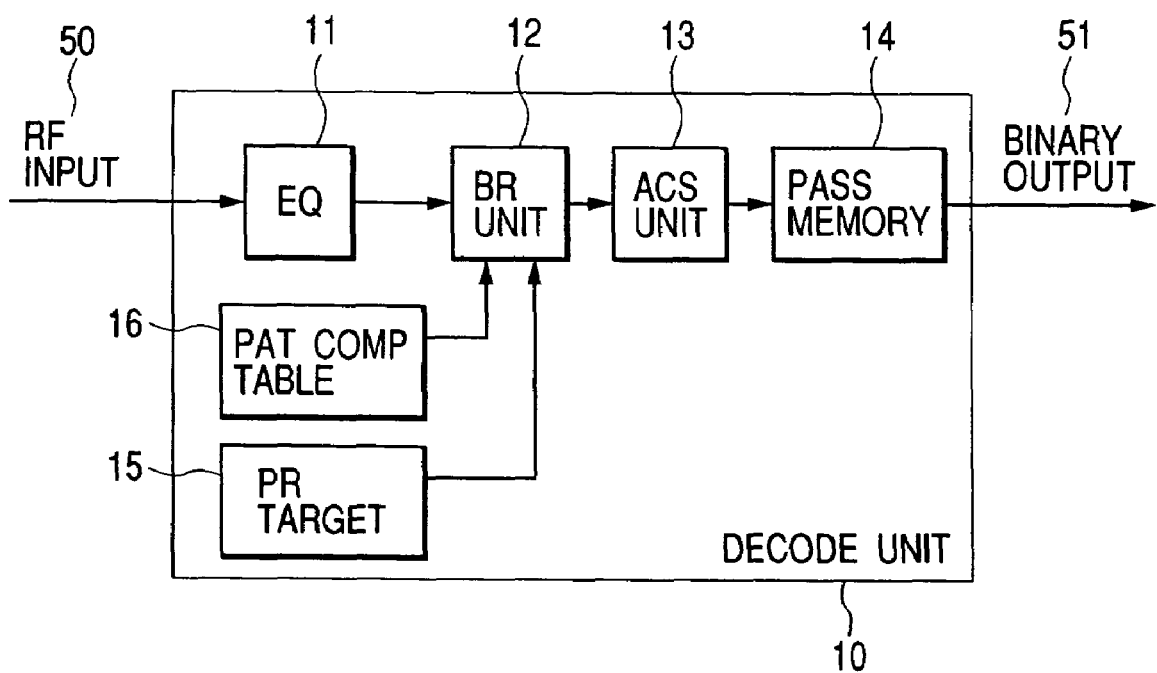
FIG. 11 is a block diagram of a decoder with respect to the basic method of the present invention.

FIG. 11 shows a block diagram of the basic method of the present invention. The decoder 10 is configured by a waveform equalizer 11, a branch metric calculation unit 12, an ACS (ADD Select Compare) unit 13, a path memory 14, a PR target table 15, and a pattern compensation table 16. An RF input (reproduced signal) 50 that is already converted to a digital value in an AD converter is subjected to an equalization processing through a FIR filter in the waveform equalizer 11, then a squared value (branch metric value) of an error from a target value is calculated for each bit array in the branch metric calculation unit 12. The target value at that time is obtained by adding up an initial target value and a compensation value obtained with reference to the PR target table 15 and the pattern compensation table 16 corresponding to the bit array.

The ACS unit 13 adds a branch metric value corresponding to each bit array to a metric value in the previous time state and each state (a branch metric value is added sequentially upon a state change, then processed so as not to be diffused). At this time, a state having a smaller metric value is selected from those in the transition step up to the current time state (usually, two states, but only one state sometimes due to the run length limitation). A "state" means a bit array stored with respect to a time state change. For example, when the number of PR class bits is 4, the bit array is expressed by 4 bits and the state is expressed by 3 bits.

The path memory 14 stores a binary value compounded for each bit array for a long time. In the memory, the data is shifted each time the time is updated, so that the memory always comes to store the latest data. The ACS unit 13 alters the arrangement order of the information stored in the path memory according to the selected transition process each time a transition process is selected. By repeating the above processings in the above units as described above, information in the path memory is integrated step by step. After a long time, the same value comes to be stored for each bit array, that is, path merging is completed. The transformed binary value 51 means binary information taken out from the path memory when the time is updated.

While a PR class target value is obtained with reference to the PR target table 15 in the above description, such a target value has often been calculated directly with use of a product sum computing unit. The main point of the present invention is to calculate a new target value by adding a compensation value to the initial target value, then transforming the result to a most likelihood binary value. Thus, both of the methods may be used to calculate such a target value with no problem.

Figure 12:
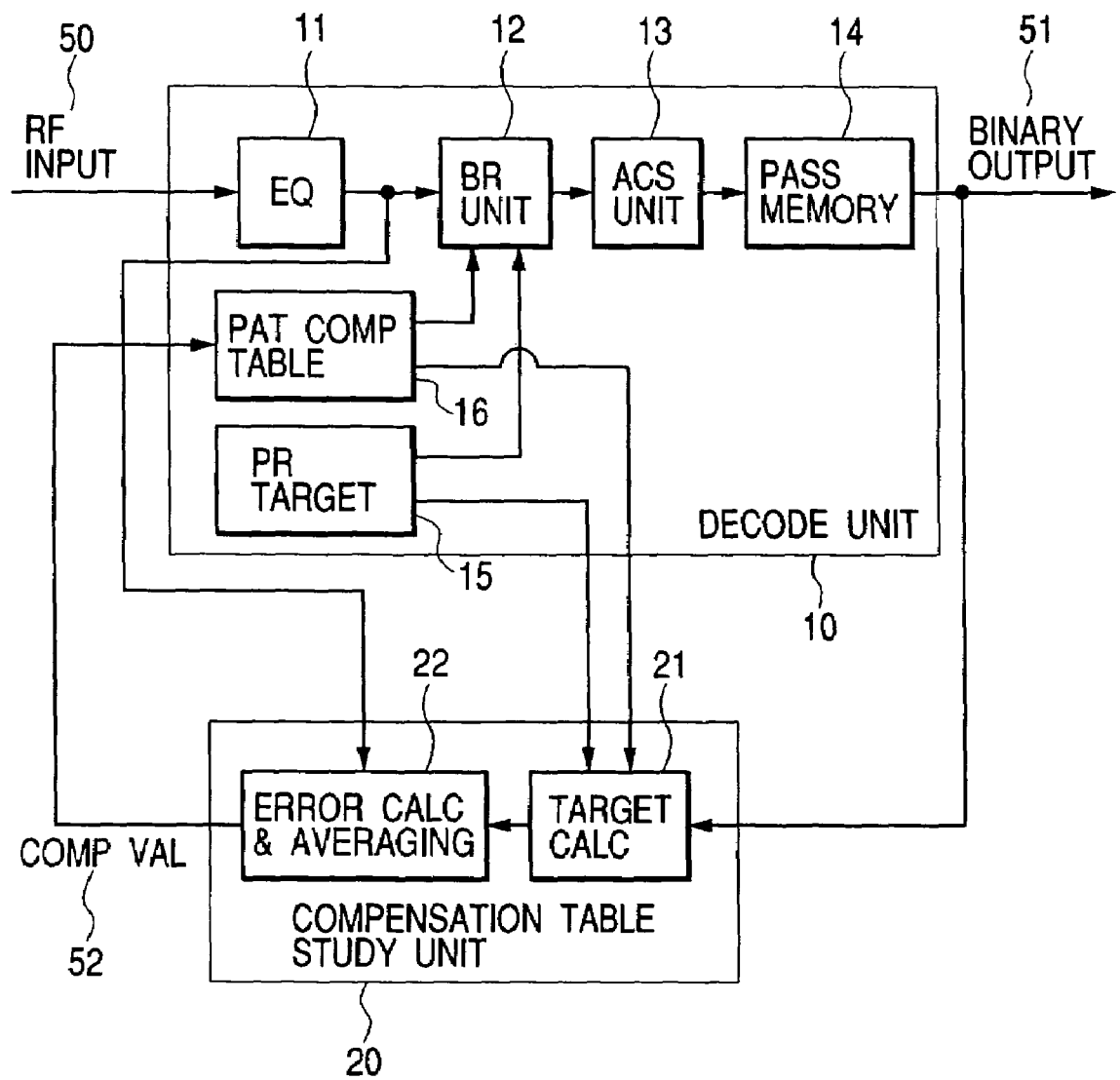
FIG. 12 is a combined block diagram of the decoder and a compensation table study unit with respect to a study method for extracting the compensation value of the present invention from a reproduced signal.

FIG. 12 shows a block diagram for realizing a study method for extracting the compensation value of the present invention from a reproduced signal. Both configuration and operation of the decoder 10 are as described above. Here, only the study method will be described.

The compensation table study unit 20 is configured by a target calculation unit 21 and an error calculation & averaging unit 22. The unit 21 stores the binarized data 51 for the number of class bits and adds up an initial target value and a compensation value according to the bit array obtained with reference to the PR target table 15 and the pattern compensation table 16, then the result is used to calculate a new target value. The processing contents are basically the same as those of the branch metric calculation unit 12. The branch metric calculation unit 12, however, calculates values for the number of bit arrays simultaneously while the target calculation unit 21 uses only the binarized data to calculate only one target value.

The error calculation & averaging unit 22 calculates an error value between the outputs of the waveform equalizer 11 and the target calculation unit 21 by comparing one output with the other. The error values are classified by bit arrays and error values obtained within a selected time are averaged to obtain an error table value corresponding to the object bit array. When such an error table value is calculated, the output of the waveform equalizer 11 is delayed by the value of a shift register, then adjusted to the delay from the output of the target calculation unit 21. The error table value 52 obtained such way is added to each value in the pattern compensation table 16, thereby each compensation value can follow up with the reproduced signal properly.

It would be natural to begin each initial value with zero in the pattern compensation table 16. And, it would be more efficient to use each initial value prepared for each medium to make good use of the study results. Such an initial value is obtained from simulation, actual measurement, the last used value with respect to a similar disk loaded in the drive.

Figure 13:
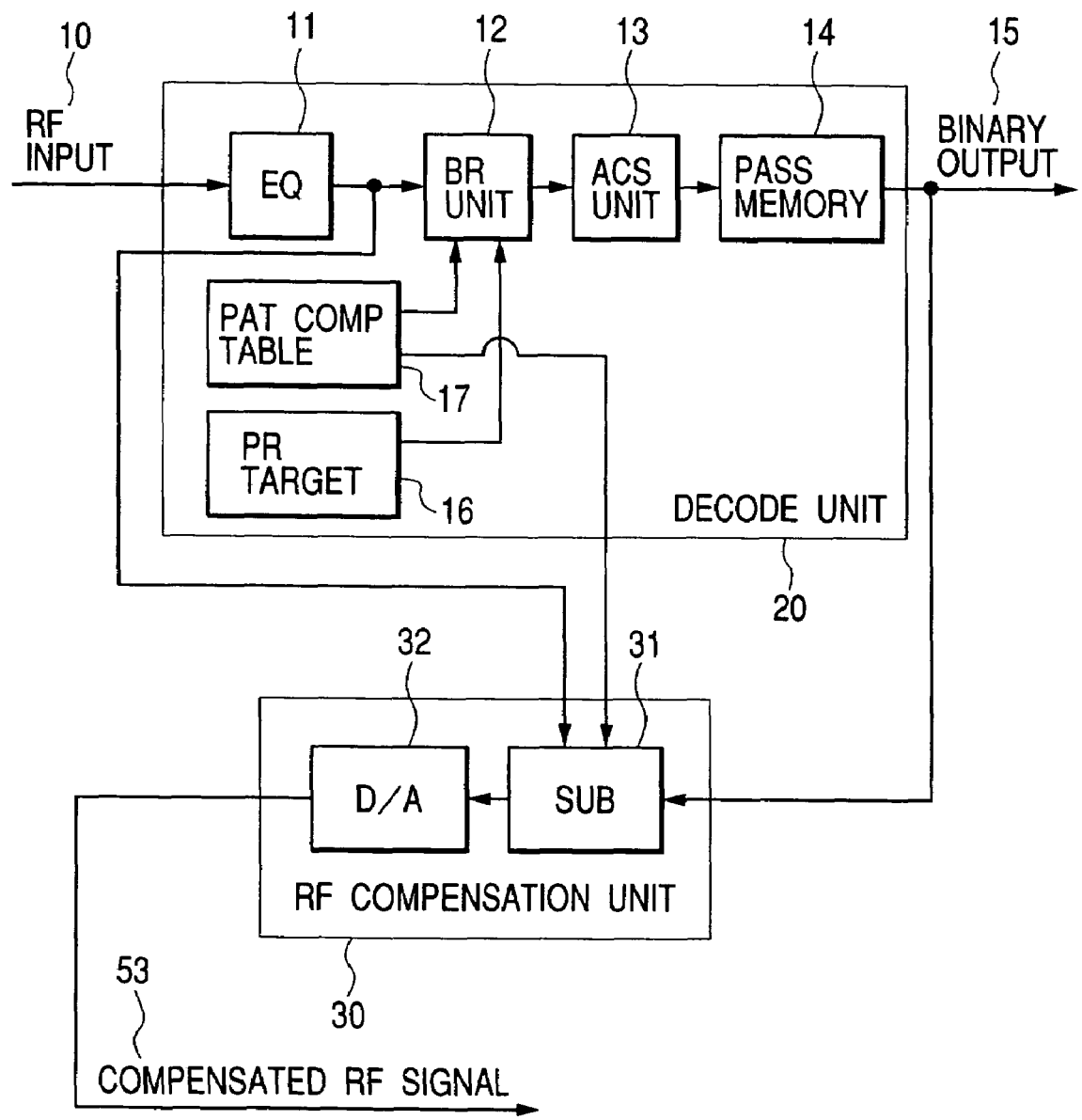
FIG. 13 is a combined block diagram of the decoder and an RF compensation unit with respect to a method for obtaining a compensated reproduced signal of the present invention.

FIG. 13 shows a block diagram for realizing the compensated reproduced signal obtaining method of the present invention. The compensated reproduced signal shown in FIG. 1 can be decided for its quality intuitively. An actual waveform equalization signal has the same eye-pattern as that shown in the method 1 in FIG. 1. If an optical disk is expanded significantly in capacity, most of 2T signals cannot be decomposed. Thus, the signal quality cannot be evaluated intuitively at a glance of this eye-pattern, so that it is not decided whether or not an error has occurred in the disk. For an optical disk, because the disk must be loaded and operated in drives of a plurality of makers, the recording/reproducing compatibility among those makers is considered as the most important item in the development. This is why evaluation is done for the difference of performance and the characteristic performance of each disk medium even among large capacity optical disk drives. In this connection, the bit error rate and the eye-pattern have conventionally been checked visually to evaluate the signal quality. Consequently, the eye-pattern that makes it possible to check the signal quality intuitively and visually will become indispensable even for large capacity optical disks in which the minimum run length signal can hardly be decomposed.

The configuration and operation of the decoder 10 in FIG. 13 are as described above. Here, a description will be made for how to obtain a compensated reproduced signal. The compensated reproduced signal 53 of the present invention is output from the reproduced signal compensation unit 30. The unit 30 is configured by a compensation computing unit 31 and a D/A converter 32. The computing unit 31 stores binarized data 51 for the number of class bits and obtains a compensation value from the pattern compensation table 16 according to each bit array, then subtracts the compensation value from the output of the waveform equalizer 11. At this time, just like the error calculation in the compensation table study unit 20 and the operation of the error calculation & averaging unit 22, the computing unit 31 adjusts the value of the delay from the waveform equalizer 11. The digital data output from the compensation computing unit 31 is converted to an analog signal by the D/A converter 32 to obtain the compensated reproduced signal 53.

The compensated reproduced signal 53, from which non-linear shift components are eliminated beforehand, can be transformed to a binary value with use of the conventional PRML method. The binary value obtained is the same as the binary value obtained with the compensation PRML method of the present invention. From this point of view, the reproduced signal compensation unit 30 can be taken as an excellent non-linear equalizer. Each of general waveform equalizers including that 11 shown here is composed as an FIR (Finite Impulse Response) filter, so that an equalized waveform is obtained by a sum product operation of a signal and a coefficient array. This is why the characteristic of a waveform equalizer is often defined as a frequency characteristic. An FIR filter returns linear type responses. If a waveform equalizer that amplifies 2T signals, for example, the equalizer also comes to amplify the noise in the 2T signal band together.

On the other hand, in the processing executed in the reproduced signal compensation unit 30, no sum product operation is made to subtract a compensation value. The frequency characteristic thus becomes non-linear, so that 2T signals can be amplified without amplifying the noise in the same signal band. The S/N ratio of the compensated reproduced signal 53 can be set larger than that of any other waveform equalizer that uses an FIR filter. The difference of the S/N ratio among various methods shown in FIG. 1 is brought with this effect. And, the present invention can improve the S/N ratio of the reproduced signals practically, thereby realizing significant expansion of optical disk capacity.

Figure 14:
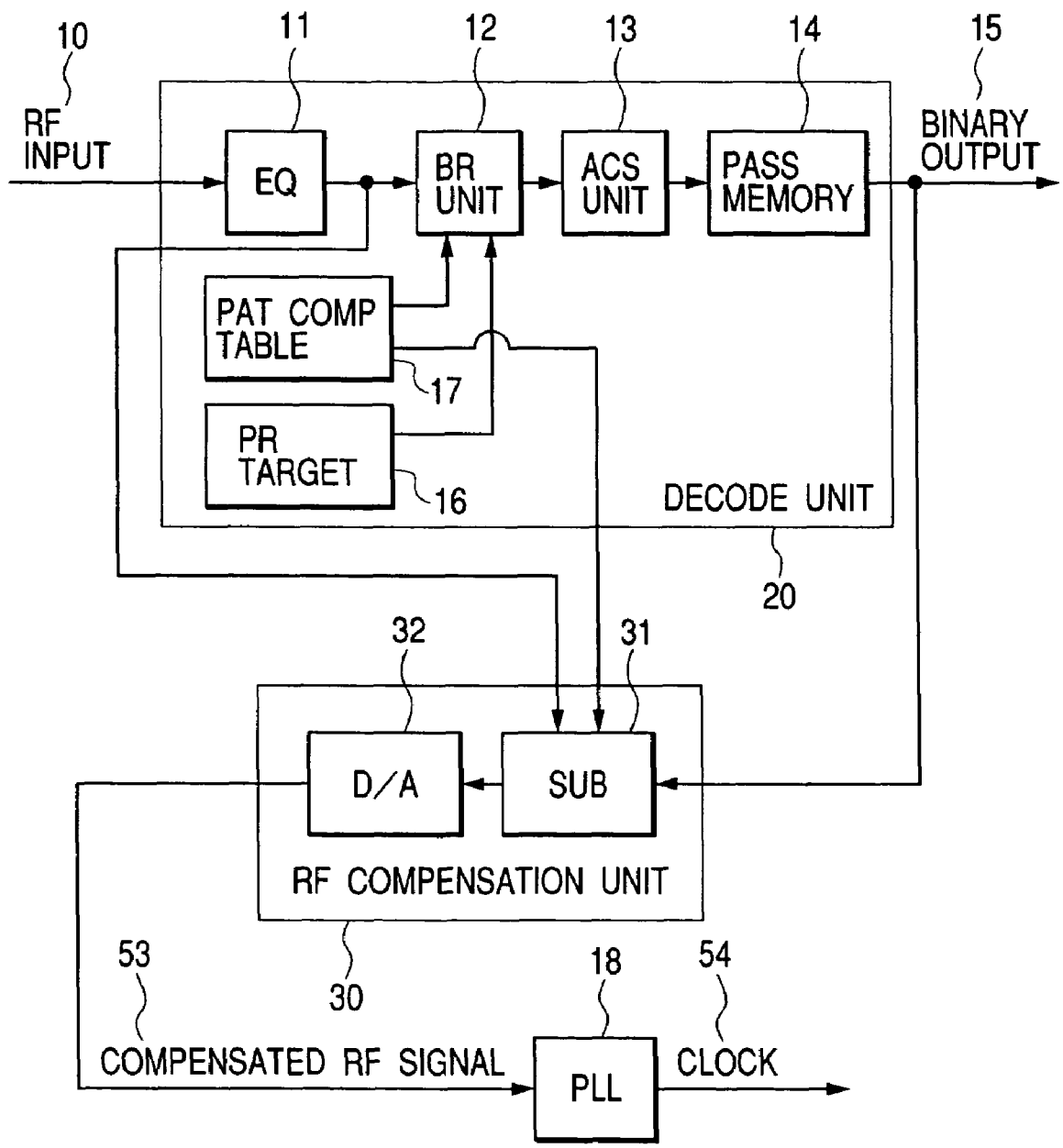
FIG. 14 is a combined block diagram of the decoder, the RF compensation unit, and a PLL circuit with respect to a method for obtaining a clock used to reproduce information with use of compensated reproduced signals of the present invention.

FIG. 14 shows a block diagram for realizing a method for obtaining a clock used to reproduce information with use of the compensated reproduced signal of the present invention. The configurations and operations of the decoder 10 and the reproduced signal compensation unit 30 shown in FIG. 14 are already described above. A description will thus be made here only for how to generate a clock.

To take out information from reproduced signals and binarize the information, a reference clock is needed. Such a clock, as well known, is often generated by a PLL (Phase Locked Loop) circuit. If the recording density increases until the minimum run length signal is not decomposed any more and reproduced signals are connected to a PLL circuit directly to generate a clock, the generated clock often becomes unstable, since the S/N ratio of the minimum run length signal is small. The shift included in each reproduced signal also becomes an external disturbance factor for joggling the clock, causing the clock to become unstable. As shown above, the compensation signal of the present invention can improve the S/M ratio and compensate the non-linear shift. If the compensated reproduced signal is connected to a PLL circuit to generate a clock, therefore, the clock will become stable very much. As shown in FIG. 13, the compensated reproduced signal 53 is just required to be connected to the PLL circuit 18 to generate the block 54 in this connection.

As described above, if a clock is generated from a compensated reproduced signal, the S/N ratio of minimum run length signals becomes low. To solve such a problem, the PLL circuit may be provided with means for removing minimum run length signals to generate a clock. And, because the method can transform signals to binary values, the method may be used to remove minimum run length edge information from each phase error signal to be sent to the VCO (Voltage Controlled Oscillator) provided in the PLL circuit. In addition, because the use of a digital PLL circuit is widespread in recent years, the above method can be realized only by adding a simple-structured logic circuit to the PLL circuit. The test results shown in FIGS. 1 through 5 are obtained by removing minimum run length signals to operate the PLL circuit. The generated clock 54 may be supplied to the decoder 10, etc.

The internal configuration of the PLL circuit is well known, so the description will be omitted here.

Figure 15:
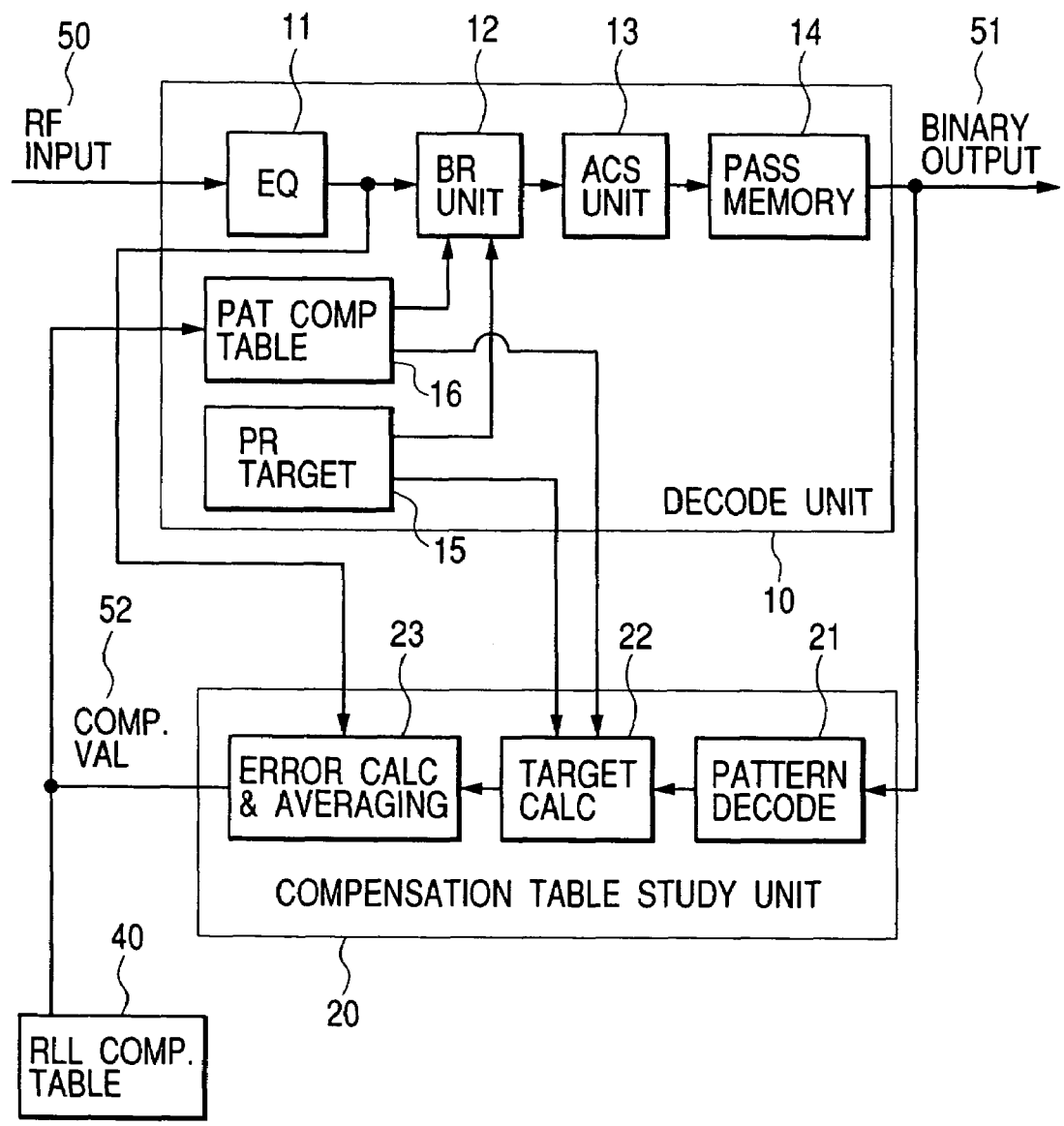
FIG. 15 is a combined block diagram of the decoder, the compensation table study unit, and a RLL compensation table with respect to a method for corresponding to signals having different run lengths with use of the reproducing method of the present invention.

FIG. 15 shows a block diagram for realizing an information reproducing method of the present invention to process signals having different run lengths. The configuration shown in FIG. 15 is obtained by adding a run length limit compensation table 40 to the configuration shown in FIG. 12. The basic operation of the configuration is the same between FIG. 12 and FIG. 15 and it is already described above. Therefore, only the functions of the run length limit compensation table 40 will be described here. The summarization of the basic concept of the configuration will be as follows.

(1) A method that uses smaller minimum run length signals is selected as the basic method.

(2) A new target value is obtained by adding a compensation value corresponding to a bit array to the initial target value decided by a convolution operation of a bit array and a PR class coefficient.

(3) Shorter run length signals are reproduced on the above conditions.

(4) Each of longer run length signals is reproduced using a compensation value according to each bit array. The compensation value is a difference between the target value of shorter run length signals and the target value of longer run length signals. Values (regardless of the sign) large enough with respect to the amplitude of reproduced signals are used as those compensation values to assume a large difference between a target value and each signal so as to limit the run length practically.

The run length limit compensation table 40 shown in FIG. 15 may be any one if it stores compensation values generated in accordance with the concept described in (4). The initial values of the pattern compensation table 16 may be the values of the run length compensation table 40 first when in reproducing of signals. The operations after that are the same as those described above.

In this connection, note the following one point, that is, the compensation value for each bit array that causes a run length limit error therein. To reproduce extremely low quality signals such as those reproduced from a medium on which dust is stuck, a defective medium, or the like, even this method cannot avoid reproduction error occurrence. Such a reproduction error causes incomplete path merging. As a result, the binary value 51 comes to include a bit array in which a run length error has occurred. In this connection, if the above-described study processing is executed for the bit array, the compensation value of the run length error-occurred bit array is updated. If such an event is repeated, the practical run length error evasive function will be lost. And, to solve such a problem, the compensation value corresponding to a bit array that causes a run length error should keep a value large enough (any sign) with respect to the amplitude of the reproduced signals. Concretely, when a study result 53 is stored in the pattern compensation table 16, the compensation value of the subject bit array is limited so as not to be updated or only the compensation value may be overwritten with a value stored in the run length limit compensation table 40 after it is updated.

FIG. 8 shows concrete values set in the run length limit compensation table. The values set in this table are those of the signals having the minimum run length of 2T with the compensated PR (1,2,2,1) of the basic method. If this basic method is used to reproduce signals having the minimum run length of 3T with the compensated PR(3,4, 4,3), PLL compensation values that can eliminate the difference among target values corresponding to each bit array may be set in the run length limit compensation table. For example, 0.000 may be used for the bit array "0000" and −0.095 may be used for the bit array "0001". And, because a run length limit error occurs in both of the bit arrays "0110" and "1001", a large value should be set in them respectively. Concretely, the value should be more than double the reproduced signal amplitude (2 in this example). Here, the value will be described as ∞.

FIG. 16 shows another concrete example of values set in the run length limit compensation table. In this case, the compensated PR(0,1,2,2,1,0) is selected basically. The description for the table is the same as that in FIG. 15. No special description will thus be made here.

To quantify the effect for reproducing signals having different run lengths, a 4.7 GB DVD-RAM disk available on the market was used in the test to reproduce information therefrom by employing the compensated PR (1,2,2,1) corresponding to the minimum run length 2T basically.

Figure 17:
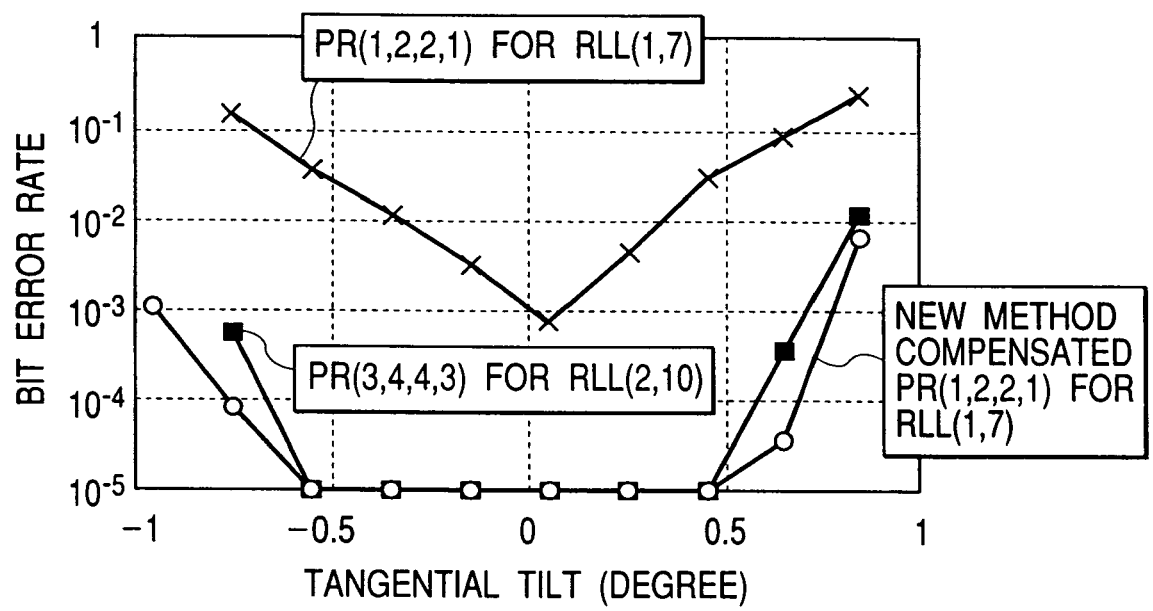
FIG. 17 is a graph of measurement results for denoting a relationship between the tangential tilt and the bit error rate of DVD-RAM disks according to the present invention.

FIG. 17 shows measurement results of a relationship between the tangential tilt and the bit error rate of the sample DVD-RAM disk. As shown in FIG. 17, when the conventional PR(1,2,2,1) method was used to reproduce the information from the DVD-RAM disk, the bit error rate never went under $10^{-4}$. On the other hand, when the compensated PR(1,2,2,1) method was used basically and the values shown in FIG. 8 were selected as the initial values, the bit error rate became $10^{-4}$ and under within ±0.5° or more. The margin value was wider than that of the conventional PR(3,4,4,3) method configured for the DVD-RAM disks and the effect of the present invention was proved.

In FIGS. 11 through 15, both configuration and operation of the PRML method of the present invention have been described. When an optical disk drive or magnetic disk drive is used actually, however, the drive will need still many peripheral parts that are not shown in FIGS. 11 through 15. For example, the drive will need a high-path filter for suppressing DC components of reproduction head signals, a pre-equalizer and a low-path filter for improving frequency characteristics, an auto gain control circuit for fixing amplitudes at a value, an A/D converter for converting analog signals to digital signals, etc. that must be added before each of the basic block configurations shown in FIGS. 11 through 15 is formed. There are also other necessary components such as a PLL circuit for generating a clock from the output of the waveform equalizer, a fault preventive function for holding the operations of the PLL circuit, the AGC circuit, etc. by detecting faults, head crushes, etc. Those functions are known widely and to be mounted easily by those who are skilled in the art. Thus, no special description will be made here.

Figure 18:
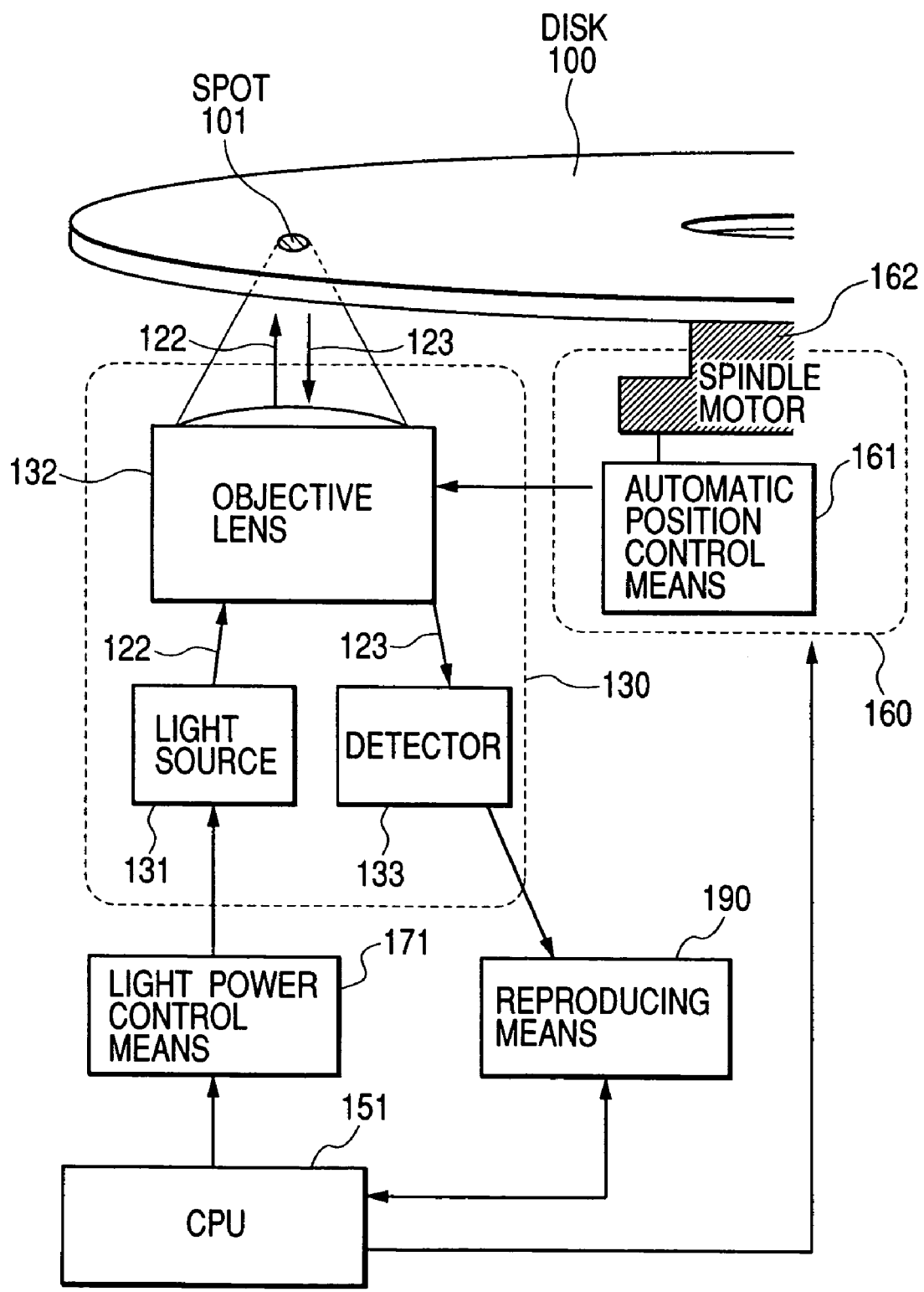
FIG. 18 is a concept chart of an optical disk drive of the present invention.

FIG. 18 shows a block diagram of an optical disk drive of the present invention. An optical disk 100 is rotated by a spindle motor 162. An optical head 130 is configured by a light source 131, an objective lens 132, and a detector 133. The optical head 130 is positioned at a given position in the radial direction of the optical disk 100 by automatic control means 161 provided in servo mechanism control means 160. Light power control means 171 controls the light source 131 to emit a light 122 having an intensity specified from a CPU 151. The light 122 is condensed by the objective lens 132 to form a spot 101 on the optical disk 100. The objective lens 132 makes both focusing and tracking operations under the control of the automatic position control means 161. A reflection light 123 from the spot 101 is converted to electrical signals to become reproduced signals in the detector 133.

The reproducing means 190 uses reproduced signals to reproduce code and address information recorded on the optical disk 100. The functions that realize the information reproducing method of the present invention described above are all stored in the reproducing means 190. Those functions may also be executed by an LSI in which the units configured as shown in the block diagrams in FIGS. 11 through 15 are mounted.

Hereunder, other aspects of the present invention will be described.

(1) According to one of the aspects of the present invention, the information reproducing method uses a PRML method in which a set of class bits is combined with a compensation bit used to distinguished between a mark and a space, thereby compensating the non-linear shift of each signal waveform to reproduce information from an optical disk.

(2) According to another aspect of the present invention, the information reproducing method uses the PRML method for binarizing each reproduced signal by selecting the most likelihood state change in a comparison between a target signal and the reproduced signal for a continuous N time. The method, if the PRML method is expressed as PR($\alpha_1, \alpha_2, \ldots, \alpha_N$)ML, comprises:

a step of using a target signal obtained by adding $2^N$ or less compensation values V2 corresponding to the value of an N-bit digital bit array to the initial target level V1 obtained by a convolution operation of N coefficient values ($\alpha_1, \alpha_2, \ldots, \alpha_N$) and an N-bit digital bit array;

a step of binarizing the reproduced signal to the most likelihood bit array while comparing the reproduced signal with the target value (V1+V2); and a step of obtaining a compensated reproduced signal by calculating a compensation value V2 for each group of N bits in a binarized bit array, then subtracting the result from the reproduced signal.

(3) According to still another aspect of the present invention, the information reproducing drive for outputting a binarized value from each reproduced signal with use of the PRML method comprises:

a state change logic corresponding to the minimum run length R1(R1≧1);

a PR target value output unit for outputting a PR class target value corresponding to an N-bit bit array;

a compensation table for storing a pattern compensation value corresponding to each M-bit (M≧N) bit array;

a waveform equalizer for equalizing the reproduced signal; and a branch metric calculation unit for calculating a branch metric value for each bit array using a target value obtained by adding a PR target value output from the PR target value output unit and a compensation value stored in the pattern compensation table to the output of the waveform equalizer.

When the information reproducing drive is to reproduce a run length limit signal having the minimum run length of R2 (R2>R1), the drive sets a value larger or smaller enough than the maximum or minimum output value of the PR target value output unit for the pattern compensation value selected from the pattern compensation values in the pattern compensation table corresponding to a bit array whose run length is at least R2 and under, thereby the reproduced signal is binarized corresponding to the minimum run length R2 practically.

As described above, the information reproducing method and the optical disk drive of the present invention can correspond to significant expansion of disk capacity and process signals having different minimum run lengths.

What is claimed is:

1. An information reproducing method that employs a PRML method for comparing a target signal with each reproduced signal for a continuous N time to select the most likelihood one of state changes therein, thereby transforming said reproduced signal to a binary value;

wherein, when said PRML method is represented as PR($\alpha$1, $\alpha$2, ..., $\alpha$N), the leftmost M1 coefficients and the rightmost M2 coefficients in a coefficient array are all zero coefficients while integer values M1 and M2 satisfy a relationship of "M1$\geqq$0, M2$\geqq$0, M1+M2$\geqq$1, M1+M2<N"; and wherein, when integer MM=M1+M2 and integer NN=N−MM are satisfied, said method includes:

a step of using a target value obtained by adding $2^N$ or less compensated values V2, stored in a pattern compensation table, corresponding to a value of an N-bit digital bit array to an initial target level V1 obtained by a convolution operation of each of NN non-zero coefficient values and an NN-bit digital bit array, said pattern compensation table being located in a decode unit;

a step of binarizing said reproduced signal to the most likelihood bit array while comparing said reproduced signal with said target value (V1+V2); and a step of outputting said binarized reproduced signal to an information reproducing device.

2. The method according to claim 1, wherein said method further includes a step of obtaining a compensated reproduced signal by calculating a compensation value V2 for each group of N bits in said binarized bit array, then subtracting the result from said reproduced signal.

3. The method according to claim 2, wherein a clock used to reproduce information is extracted from said compensated reproduced signal.

4. The method according to claim 1, wherein a clock used to reproduce information is generated without using phase information obtained from a minimum run length mark.

5. An information reproducing method that employs a PRML method for selecting the most likelihood one of state changes in a reproduced signal while comparing a target signal with each reproduced signal obtained for a continuous N time, thereby binarizing said reproduced signal to a binary value;

wherein, when said PRML method is represented as PR($\alpha$1, $\alpha$2, ..., $\alpha$N)ML, the logic of said state change excludes a state change logic of a reproduced signal whose minimum run length is R1 and under in accordance with the minimum run length R1 (R1$\geqq$1);

wherein said method includes:

a step of using a target value obtained by adding $2^N$ or less compensation values V2 corresponding to a value of an N-bit digital bit array to an initial target level V1 obtained by a convolution operation of each of N coefficient values ($\alpha$1, $\alpha$2, ..., $\alpha$N) and an N-bit digital bit array;

a step of binarizing said reproduced signal to the most likelihood bit array while comparing said reproduced signal with said target value (V1+V2);

a step of setting a value larger than an amplitude of said reproduced signal as said compensation value V2 corresponding to said N-bit digital bit array if the run length of said N-bit digital bit array is R2 and less than the minimum run length R2 (R2>R1) signal is to be reproduced; and outputting the results of the step of binarizing and the step of setting to an information reproducing device.

6. The method according to claim 5, wherein a clock used to reproduce information is generated without using phase information obtained from a minimum run length mark.

7. An information reproducing drive for outputting a binary value obtained from a reproduced signal with use of a PRML method, said drive comprising:

a PR target output unit for outputting a PR class target value corresponding to an N-bit bit array;

a decode unit including a pattern compensation table for storing a compensation value corresponding to each M-bit bit array, where M is greater than N;

a waveform equalizer for equalizing a reproduced signal; and a branch metric calculation unit for calculating a branch metric value for each M-bit bit array by employing a target value obtained by adding up a PR target value output from said PR target value output unit and a compensation value stored in said pattern compensation table with respect to an output from said waveform equalizer.

8. The drive according to claim 7, wherein said drive further includes a compensation table study unit for correcting said pattern compensation table so as to minimize an error between an output from said waveform equalizer and said target value calculated in accordance with an obtained binary bit array.

9. The drive according to claim 7, wherein said drive further includes:

a compensation calculation unit for storing binary class bits and obtaining a compensation value corresponding to said N-bit array, then subtracting the output from said waveform equalizer; and a D/A converter for converting an output of said compensation calculation unit to an analog signal.

10. The drive according to claim 9, wherein said drive further includes a PLL circuit for inputting an output of said D/A converter; and wherein said PLL circuit generates a clock.

* * * * *